Feb. 7, 1933.   H. J. MURPHY   1,896,460
LUBRICATING APPARATUS
Original Filed March 28, 1928   2 Sheets-Sheet 1
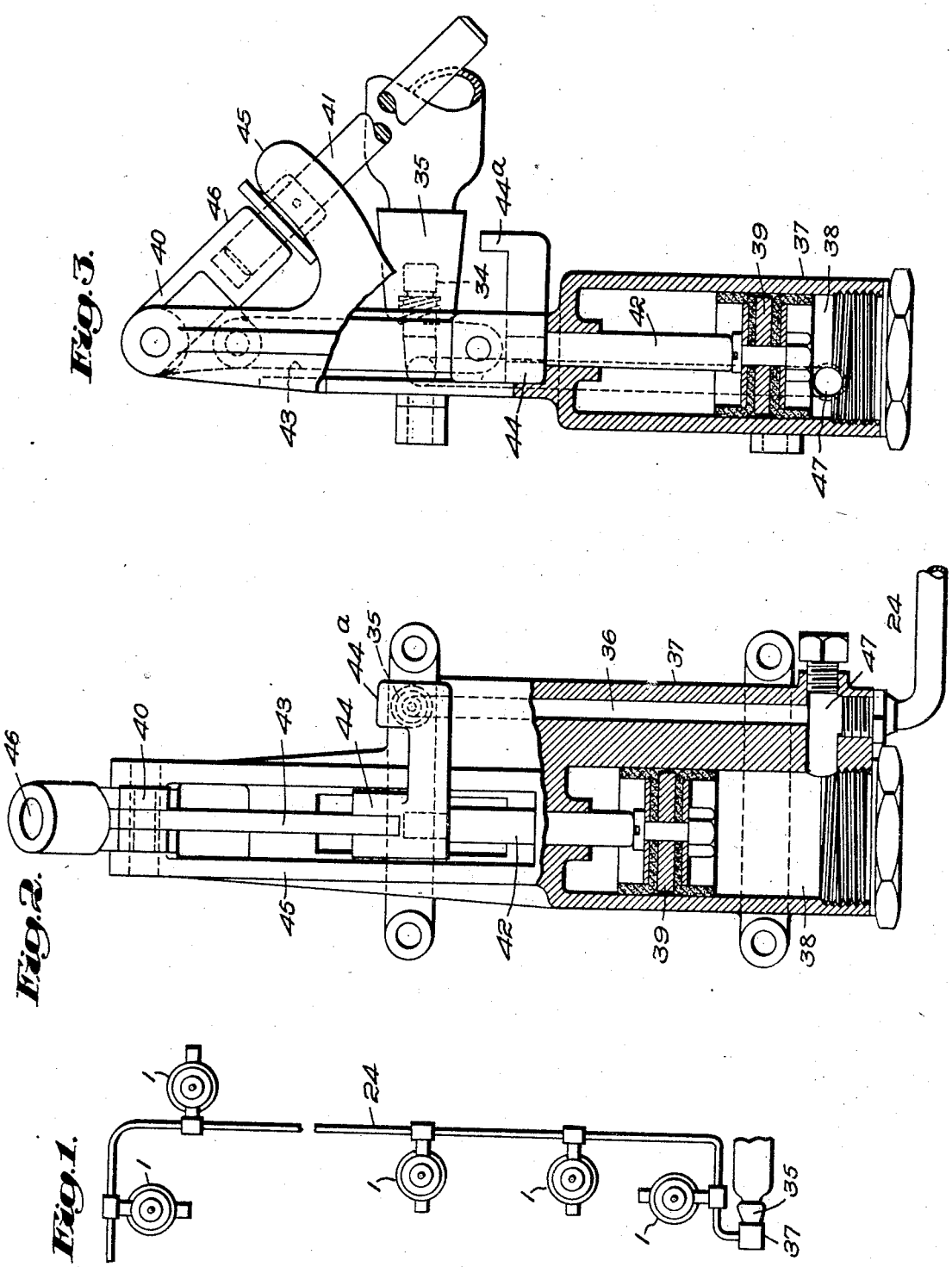
Inventor:
Howard J. Murphy
by Emery, Booth, Janney & Varney
Attys Feb. 7, 1933. H. J. MURPHY 1,896,460
LUBRICATING APPARATUS
Original Filed March 28, 1928 2 Sheets-Sheet 2
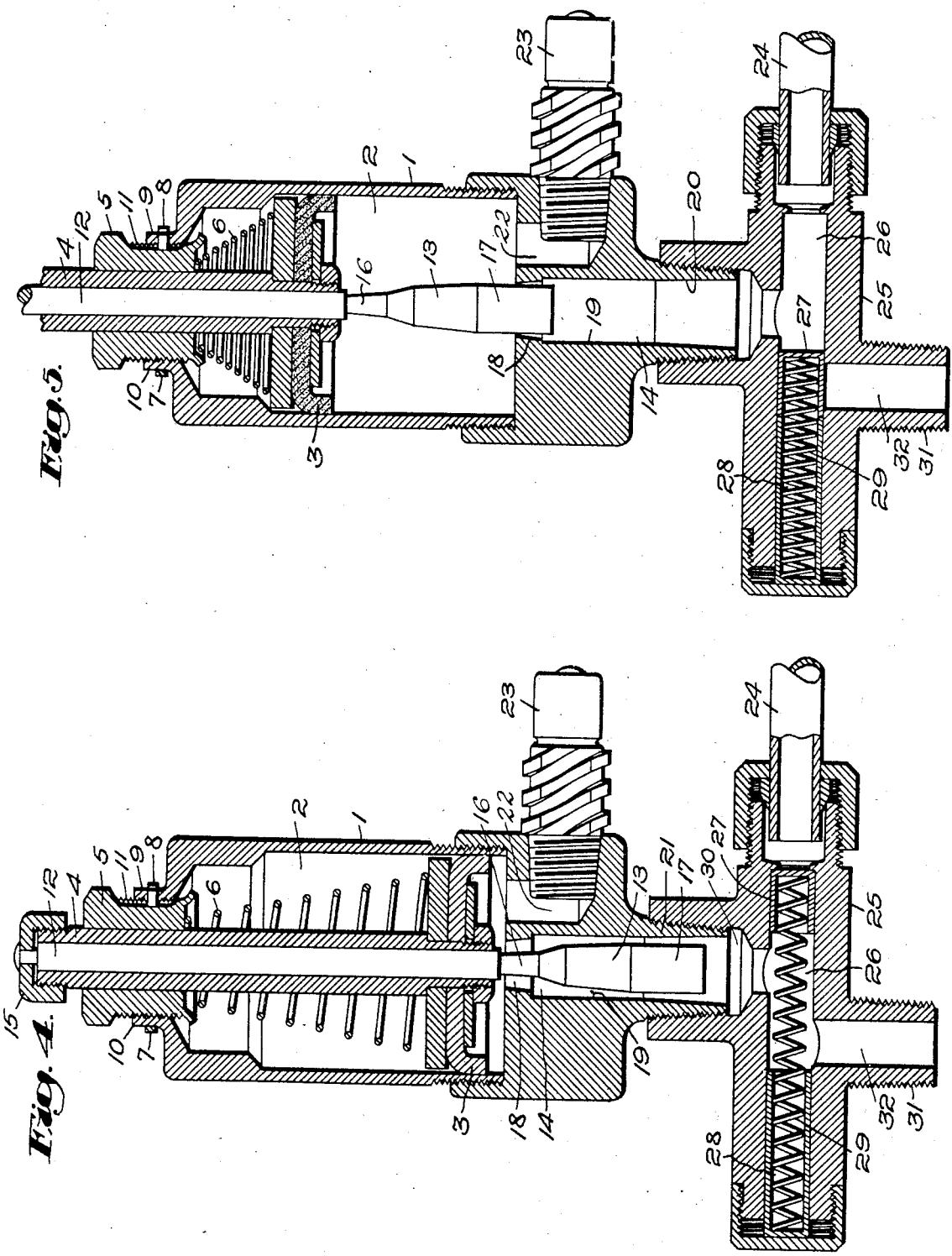

Patented Feb. 7, 1933

1,896,460

UNITED STATES PATENT OFFICE

HOWARD J. MURPHY, OF READING, MASSACHUSETTS, ASSIGNOR, BY MESNE ASSIGNMENTS, TO ALEMITE CORPORATION, OF CHICAGO, ILLINOIS, A CORPORATION OF DELAWARE

LUBRICATING APPARATUS

Original application filed March 28, 1928, Serial No. 265,276. Divided and this application filed November 21, 1928. Serial No. 320,870.

My invention aims to provide improvements in lubricating apparatus and is directed more particularly to a system of filling and controlling a series of lubricant cups.

This is a divisional application of my co-pending application Serial No. 265,276, filed March 28, 1928.

In the drawings, which illustrate preferred embodiments of my invention:—

Figure 1 is a diagrammatic view in plan showing several cups connected by conduit means and also showing diagrammatically a pressure relief device connected to the conduit means and having means to which the end of a lubricant-expelling device may be attached;

Fig. 2 is a part front elevation and part section of the pressure relief device shown diagrammatically in Fig. 1, and showing the position of the parts when the pressure in the conduit means has been relieved;

Fig. 3 is a part side elevation and part section of the pressure relief device shown in Fig. 2 and showing a nozzle attached for forcing lubricant through the inlet passages into the cups and also showing the relation of the parts when lubricant is supplied to a system of which the relief device forms a part;

Fig. 4 is a vertical section through one of the cups of the system and showing the valvular means associated with the discharge end thereof; and Fig. 5 is a section similar to that shown in Fig. 4, except that in this figure the reservoir is shown as being filled, the parts of the valvular device being shown in the positions which they occupy when the cup is being filled, and in this instance a portion of a conduit is shown to indicate that this cup may be one of several connected together which receive their lubricant supply from a common source.

Referring to the drawings which illustrate preferred embodiments of my invention, I have shown a lubricating system including lubricant cup means particularly adapted for supplying lubricant at substantially uniform rates to machine bearings. The cups are shown connected by a common conduit to a source of supply so that several of them may be filled at one time from a common source, or each may be filled individually.

The cup illustrated by Figs. 4 and 5 has the usual body portion 1 providing a reservoir 2 for storing lubricant. Within the reservoir 2 is a piston 3 to which is attached a hollow stem 4 extending upwardly through an adjusting nut 5. The nut 5 is threaded into engagement with the upper end of the body portion 1 and has its lower end flared outwardly to prevent its being accidentally withdrawn from the body portion.

A spring 6 is interposed between the flared end of the nut 5 and the piston to urge the piston downwardly for expelling lubricant from the reservoir 2. By turning the nut in one direction or the other, the tension of the spring may be adjusted.

In some instances the cups are attached to moving bearings and the jar of the cup may change the adjustment of the nut 5, so I have provided a spring ring 7 having a catch portion 8 passing through a hole 9 in the collar 10 to engage the slot 11 in the nut. With this arrangement, the nut 5 may be readily adjusted by hand from the exterior of the cup, but the adjustment cannot be changed accidentally, as by jarring the cup.

A stem 12 passes through the hollow stem 4 and has a lubricant flow-controlling portion 13 extending downwardly below the piston 3 for passage into the discharge passage 14. The upper end of the stem 12 is attached to a thumb nut 15 threadedly connected to the outside of the hollow stem 4 to permit axial adjustment of the flow-controlling portion 13 relative to the piston 3.

The flow-controlling portion 13 may be considered as having a curved tapered external surface from adjacent its free end to the reduced portion 16 where it connects with the stem 12. However, I have shown the flow-controlling portion as being formed by a series of straight tapers, except at the free end (which is cylindrical), because these are much easier to machine and therefore can be produced much more cheaply without, to any appreciable extent, affecting the operation of the device.

The discharge passage 14 adjacent to where it opens into the reservoir 2 is only slightly larger in diameter than the end portion 17 of the flow-controlling portion 13. From this point, the wall 18 of the passage tapers and enlarges the passage 14. Then the passage is abruptly enlarged somewhat and extends for a substantial distance, preferably with a cylindrical wall 19 surrounding it. The remaining portion of the passage is surrounded by a tapered wall 20, as clearly shown in Figs. 1 and 2. This last mentioned tapered portion 20 is provided to reduce the resistance to the passage of lubricant through the discharge passage 14 without affecting the strength of the reduced end portion 21 of the cup.

When the reduced end portion 21 of the body portion of the cup is attached directly to a bearing, the reservoir may be filled through the inlet passage 22. For individual filling of a cup, a nipple 23 for receiving the discharge nozzle of a lubricant-expelling device may be attached to the cup, as shown in Figs. 4 and 5. When several cups are to be filled from a common source of supply, one branch of the conduit means 24 (Fig. 1) may be connected to the body portion 1 in place of the nipple 23.

The operation of the cup so far described may be as follows:—

Assuming the reservoir 2 is empty, the parts of the cup will be positioned as shown in Fig. 4. As lubricant is forced under pressure into the inlet passage 22 the piston will be raised, thereby raising the flow-controlling portion 13. During the filling operation, the spring will be compressed and at the same time the cross-section of the orifice between the outside of the portion 13 and the wall 18 will become smaller and smaller, thereby preventing direct passage of all the lubricant through the reservoir to the bearing. Of course, it is understood that some lubricant will be discharged through the passage 14, but nevertheless the cup will fill. Therefore, the continual reducing of the orifice area compensates for the increased pressure of the spring and permits entire filling of the reservoir, as shown by Fig. 5.

During the discharge period of the cup the spring presses the piston 3 against the lubricant and forces it through the orifice into the discharge passage. By reason of the flow-controlling portion 13 being carried downwardly with the piston 3, passage of lubricant is controlled by changing the size of the orifice. This counteracts for the lack of pressure due to the decrease in the compression of the spring and provides for a substantially uniform flow of lubricant from the cup to the bearing to which it may be attached.

When using lubricants of various viscosities, or when for any reason it is desirable to change, or regulate, the flow of lubricant, the stem 12 may be adjusted to change the relative position of the flow-controlling portion 13 by merely turning the thumb nut 15 to raise or lower the stem with respect to the piston 3. Also the tension of the spring 6 may require some adjustment depending upon the lubricant used. This adjustment may be very readily made by turning the nut 5.

In some instances (especially when lubricating relatively loose bearings) it may be advisable to attach a valvular device to the end 21 of the cup, as shown in Figs. 4 and 5. This device has a body portion 25 having an inlet bore 26 in which is located a valve part 27, a valve seat part 28 and a spring 29. A passage 30 connects the outlet passage 14 of the cup with the bore 26 and another passage 31, offset relative to the passage 30, leads to the bearing (not shown) to which the threaded portion 32 may be attached.

When filling a cup through the valvular device, the lubricant passing into the inlet bore 26 will force the valve part 27 into the position shown in Fig. 5 and permit direct passage of the lubricant to the reservoir 2. At the same time, the valve presses against its seat part 28 and covers the passage 31, thereby preventing passage of lubricant to the bearing when the cup is being filled. This system is especially useful when filling several cups from a single source because all the cups are sure to be filled, whereas without the valvular means some of the cups might be filled partly or not at all, due to leaky bearings.

As a further improvement in connection with filling several cups from a single point and by means of conduit means, as shown in Fig. 1, I have shown (diagrammatically in Fig. 1 and more in detail in Figs. 2 and 3) a relief device with its associated means. This device has a lubricant-receiving nipple 34 with which may be engaged a nozzle 35 of a lubricant-expelling device, as shown in Fig. 3. A passage 36 leads directly from the nipple 34 to a point where the conduit means 24 is attached to the body portion 37 of the relief device, as shown in Fig. 2.

A piston chamber 38 is provided in which is a piston part 39. The body portion 37 has a part 40 pivoted at its upper end and adapted to receive a removable handle 41 by which the part 40 is moved about its pivot.

A rod 42 is reciprocably mounted in the body portion and is connected by a link 43 with the part 40, as illustrated by Figs. 2 and 3. This rod 42 is adapted to move the piston downwardly, as shown in Fig. 3.

The connecting part 44 which connects the rod 42 with the link 43 has a finger portion 44ª extending therefrom and normally passing in front of the end of the nipples 34, as shown by Fig. 2, to prevent engagement of the nozzle 35 with the nipple. An arm portion 45 is also provided as a means for preventing removal of the handle 41 when the piston part 39 is held at the lower end of the piston chamber 38, as shown in Fig. 3.

A system provided with the relief device just described may be operated as follows:— First, the handle 41 is inserted in the socket portion 46 of the part 40, and is then moved downwardly from the position of Fig. 2 to the position of Fig. 3. This action causes the rod 42 to be moved downwardly, which, in turn, moves the piston 39 to the position shown in Fig. 3. The downward movement of the rod 42 also carries the finger 44ª downwardly and away from in front of the nipple 34. The nozzle 35 of the supply device is then connected to the nipple 34 (Fig. 3) and lubricant is forced through the passage 36, to the conduit 24 and then to the cups. Lubricant will also pass through the port 47 to the piston chamber 38, but it cannot return the piston 39, because the link 43 is located on the axis of the rod 42 and pivot of the part 40.

When the cups have been filled, the nozzle 35 is removed and the handle moved upwardly to draw the rod away from the piston and return the other movable parts to their normal positions, as shown by Fig. 2. Thus, the piston 39 is free to move upwardly and the pressure is reduced by flowing from the conduit means 24 back into the piston chamber 38. As the pressure in the conduit is reduced, the springs 29, of the valvular devices, move the valve parts 27 to their normal positions, as shown in Fig. 4, thereby allowing the lubricant to be forced from the cups to the respective bearings which they supply.

I have illustrated and described a particular cup construction and a particular pressure relief device, but I wish to have it understood that I am not limited to the particular details of construction shown and described.

While I have illustrated and described preferred embodiments of my invention, I do not intend to be limited thereby, as the scope of my invention is best defined in the following claims.

I claim:

1. A lubricating system including a number of lubricant cups for discharging lubricant at a relatively slow uniform rate to machine bearings, conduit means connecting said cups with a source of lubricant supply, valvular means associated with said cups whereby the discharge of lubricant is cut off to insure positive filling of the cups, a device connected to the conduit and presenting a lubricant-receiving nipple for receiving the nozzle of a lubricant-expelling device which supplies the lubricant to the cups, relief means for relieving the pressure of the lubricant in the conduit means and means operable to prevent connection of a lubricant supply device with the said nipple, unless the relief means is first placed in position for relieving the pressure in the conduit after the cups have been filled.

2. A lubricating system including a number of lubricant cups for discharging lubricant at a relatively slow uniform rate to machine bearings, conduit means connecting said cups with a source of lubricant supply, valvular means associated with said cups whereby the discharge of lubricant is cut off to insure positive filling of the cups, a pressure-controlling device connected to the conduit means, said device having a chamber connected to the conduit means, a piston in said chamber, a connection carried by said device for engagement with a source of lubricant supply, a passage from said connection to said conduit means through which lubricant may pass from the supply to the conduit means and means associated between the connection and the piston and operable to prevent engagement of the source of lubricant supply with the connection unless said piston is adjacent to the point where the said chamber connects with the conduit means.

3. A lubricating system including a number of lubricant cups for discharging lubricant at a relatively slow uniform rate to machine bearings, conduit means connecting said cups with a source of lubricant supply, valvular means associated with said cups whereby the discharge of lubricant is cut off to insure positive filling of the cups, a pressure-controlling device connected to the conduit means, said device having a chamber connected to the conduit means, a piston in said chamber, a connection carried by said device for engagement with a source of lubricant supply, a passage from said conection to said conduit means through which lubricant may pass from the supply to the conduit means, means associated between the connection and the piston and operable to prevent engagement of the source of lubricant supply with the connection unless said piston is adjacent to the point where the said chamber connects with the conduit means and manually operable means for moving the piston into said position.

4. A lubricating system including a number of lubricant cups for discharging lubricant at a relatively slow uniform rate to machine bearings, conduit means connecting said cups with a source of lubricant supply, valvular means associated with said cups whereby the discharge of lubricant is cut off to insure positive filling of the cups, a pressure-controlling device connected to the conduit means, said device having a chamber connected to the conduit means, a piston in said chamber, a connection carried by said device for engagement with a source of lubricant supply, a passage from said connection to said conduit means through which lubricant may pass from the supply to the conduit means, an axially movable rod adapted to be moved in one direction by said piston when the lubricant is released from the conduit means into said chamber, manually operable means for moving said rod in the opposite direction to force the piston toward that end of the chamber adjacent to where the conduit means is connected, and a finger carried by said rod to obstruct said connection when the rod is moved by the said piston.

5. A lubricating system including a number of lubricant cups for discharging lubricant at a relatively slow uniform rate to machine bearings, conduit means connecting said cups with a source of lubricant supply, valves associated with the conduit means adjacent to where the conduit means connects with the cups, a pressure relief device connected to the conduit means, said device having a chamber connected to the conduit means, a piston in said chamber, a connection carried by said device for engagement with a source of lubricant supply, a passage from said connection to said conduit means through which lubricant may pass from the supply to the conduit means and means associated between the connection and the piston and operable to prevent engagement of the source of lubricant supply with the connection unless said piston is adjacent to the point where the said chamber connects with the conduit means.

In testimony whereof, I have signed my name to this specification.

HOWARD J. MURPHY.